(12) United States Patent  (10) Patent No.: US 7,467,331 B2
Agha et al.  (45) Date of Patent: Dec. 16, 2008

(54) PRESERVATION OF ERROR DATA ON A DISKLESS PLATFORM

(75) Inventors: Salim Ahmed Agha, Rochester, MN (US); Brent Robert Tiefenthaler, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 105 days.

(21) Appl. No.: 11/468,261

(22) Filed: Aug. 29, 2006

(65) Prior Publication Data

US 2007/0006049 A1  Jan. 4, 2007

Related U.S. Application Data

(63) Continuation of application No. 10/424,199, filed on Apr. 25, 2003, now Pat. No. 7,168,002.

(51) Int. Cl.
 *G06F 11/00* (2006.01)
(52) U.S. Cl. .......................................... 714/24; 714/45
(58) Field of Classification Search .................. 714/24, 714/45
 See application file for complete search history.

(56) References Cited

U.S. PATENT DOCUMENTS

| | | | |
|---|---|---|---|
| 4,843,541 A | 6/1989 | Bean et al. | |
| 5,396,637 A | 3/1995 | Harwell et al. | |
| 5,659,786 A | 8/1997 | George et al. | |
| 5,964,813 A | 10/1999 | Ishii et al. | |
| 6,145,068 A | 11/2000 | Lewis | |
| 6,243,831 B1 | 6/2001 | Mustafa et al. | |
| 6,304,981 B1 | 10/2001 | Spears et al. | |
| 6,401,163 B1 | 6/2002 | Kondo et al. | |
| 6,467,007 B1 | 10/2002 | Armstrong et al. | |
| 6,535,996 B1 | 3/2003 | Brewer et al. | |
| 6,606,628 B1* | 8/2003 | Monsen et al. | 707/100 |
| 6,651,182 B1* | 11/2003 | Chang et al. | 714/3 |
| 6,694,453 B1 | 2/2004 | Shukla et al. | |
| 6,721,207 B2* | 4/2004 | Tsujikawa et al. | 365/185.28 |
| 6,792,564 B2* | 9/2004 | Ahrens, Jr. et al. | 714/45 |
| 6,856,940 B2* | 2/2005 | Loehr et al. | 702/182 |
| 6,912,493 B1 | 6/2005 | Scheel et al. | |
| 6,959,399 B2 | 10/2005 | King et al. | |
| 7,002,905 B1* | 2/2006 | Khouri et al. | 370/216 |
| 2002/0124209 A1* | 9/2002 | Faust et al. | 714/37 |
| 2002/0124215 A1* | 9/2002 | Austen et al. | 714/57 |
| 2003/0140275 A1 | 7/2003 | Imada | |

* cited by examiner

*Primary Examiner*—Scott T. Baderman
*Assistant Examiner*—Paul F Contino
(74) *Attorney, Agent, or Firm*—Patterson & Sheridan, LLP

(57) ABSTRACT

A method for preserving error data on a computing platform that lacks non-volatile storage (e.g., a "diskless" platform) is provided. In response to detecting a platform error (e.g., automatically by hardware, software, or manually by a user when a wait or loop condition is suspected), platform error data may be gathered and temporarily stored in volatile storage accessible on the platform. In order to preserve the platform error data in the event power is lost after the error, the platform error data is transferred to a target system with access to non-volatile storage. Once the target system indicates the platform error data has been stored in non-volatile storage, the volatile storage used to temporarily store the platform error data may be freed-up.

3 Claims, 4 Drawing Sheets

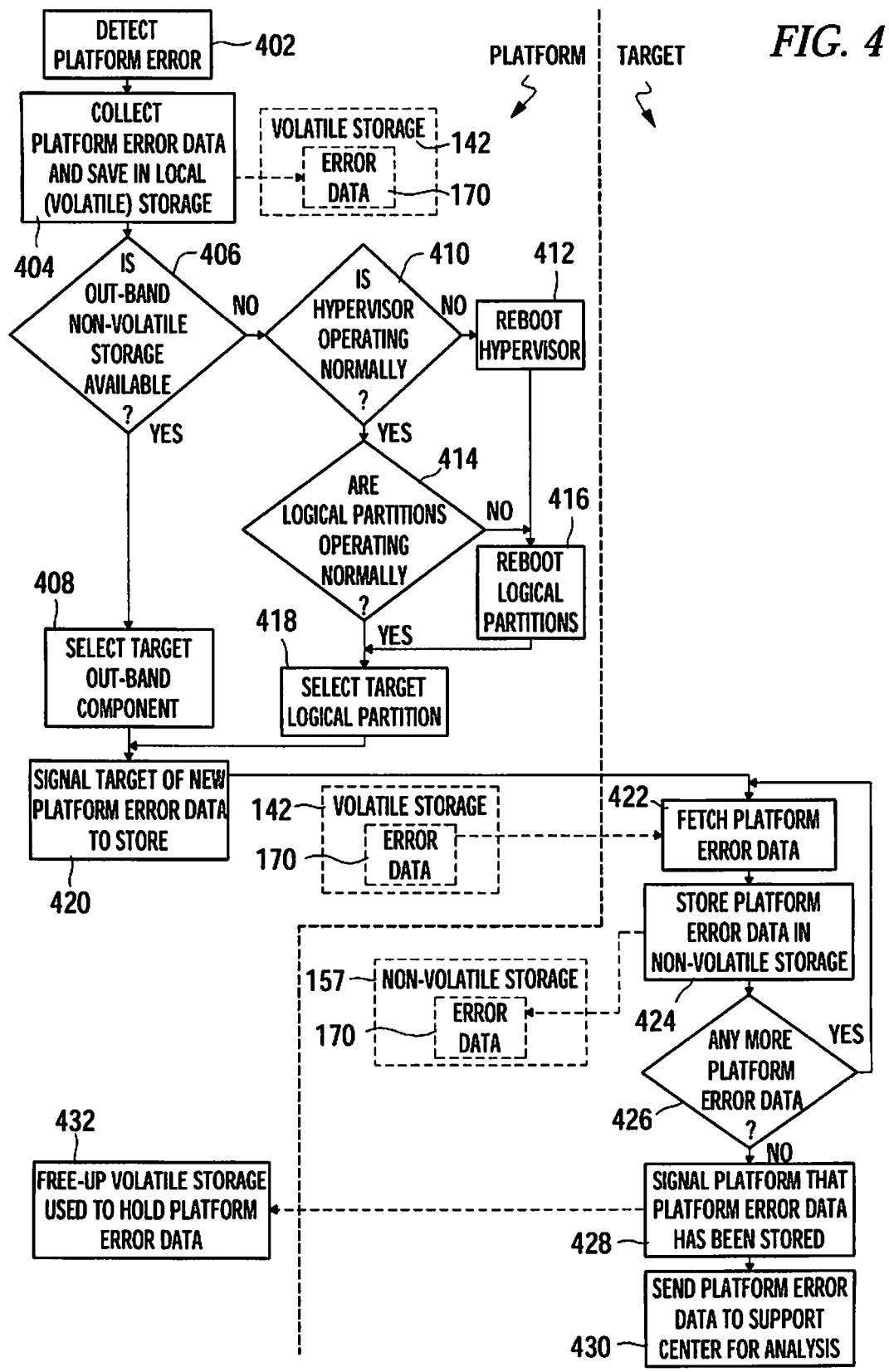

PRESERVATION OF ERROR DATA ON A DISKLESS PLATFORM

CROSS-REFERENCE TO RELATED APPLICATIONS

This application is a continuation of U.S. patent application Ser. No. 10/424,199, filed Apr. 25, 2003, now U.S. Pat. No. 7,168,002 which is herein incorporated by reference in its entirety. The present application is related to U.S. patent application Ser. No. 09/672,043, filed Sep. 29, 2000, entitled "Technique for Configuring Processors in System With Logical Partitions"; U.S. patent application Ser. No. 09/346,206, filed Jul. 1, 1999, entitled "Apparatus for Supporting a Logically Partitioned Computer System"; U.S. Pat. No. 6,467,007, entitled "Processor Reset Generated Via Memory Access Interrupt"; U.S. Pat. No. 5,659,786, entitled "System and Method for Dynamically Performing Resource Reconfiguration in a Logically Partitioned Data Processing System" and U.S. Pat. No. 4,843,541, entitled "Logical Resource Partitioning of a Data Processing", which are herein incorporated by reference.

BACKGROUND OF THE INVENTION

1. Field of the Invention

The present invention generally relates to computer system platforms and, more particularly, to the preservation of error data on a platform that does not have direct access to non-volatile storage.

2. Description of the Related Art

In a computing environment, parallel processing generally refers to performing multiple computing tasks in parallel. Traditionally, parallel processing required multiple computer systems, with the resources of each computer system dedicated to a specific task, or allocated to perform a portion of a common task. However, recent advances in computer hardware and software technologies have resulted in single computer systems capable of highly complex parallel processing, through the use of multiple processors.

In some cases, a multi-processor system is logically partitioned, with one or more of the processors dedicated to, or shared among, each of several logical partitions. In a logically partitioned computer system, available system resources, such as the processors, volatile memory (i.e., memory not maintained in the absence of power), and various I/O devices, are allocated among multiple logical partitions, each designed to appear to operate independently of the other. Management of the allocation of resources among logical partitions is typically accomplished via a layer of system firmware, commonly referred to as a partition manager.

An objective of the partition manager is to allow each logical partition to independently run software (e.g., operating systems and operating system-specific applications), typically developed to run on a dedicated computer system, with little or no modification. For example, one logical partition may be running a first operating system, such as IBM's OS/400, a second logical partition may be running a second operating system, such as IBM's AIX, while a third logical partition may be running a third operating system, such as Linux. By providing the ability to run multiple operating systems on the same computer system, a logically partitioned system may provide a user with a greater degree of freedom in choosing application programs best suited to the user's needs with little or no regard to the operating system for which an application program was written.

Logical partitioning of a large computer system has several potential advantages. For example, a logically partitioned computer system is flexible in that reconfiguration and re-allocation of resources may be easily accomplished without changing hardware. Logical partitioning also isolates tasks or groups of tasks, which may help prevent any one task or group of tasks from monopolizing system resources. Logical partitioning may also facilitate the regulation of resources provided to particular users, which may be integral to a business model in which the computer system is owned by a service provider who provides computer services to different users on a fee-per-resource-used or "capacity-on-demand" basis. Further, as described above, logical partitioning makes it possible for a single computer system to concurrently support multiple operating systems, since each logical partition can be executing in a different operating system.

Additional background information regarding logical partitioning can be found in the following commonly owned patents and patent applications, which are herein incorporated by reference: Ser. No. 09/672,043, filed Sep. 29, 2000, entitled "Technique for Configuring Processors in System With Logical Partitions"; Ser. No. 09/346,206, filed Jul. 1, 1999, entitled "Apparatus for Supporting a Logically Partitioned Computer System"; U.S. Pat. No. 6,467,007, entitled "Processor Reset Generated Via Memory Access Interrupt"; U.S. Pat. No. 5,659,786, entitled "System And Method For Dynamically Performing Resource Reconfiguration In A Logically Partitioned Data Processing System"; and U.S. Pat. No. 4,843,541, entitled "Logical Resource Partitioning Of A Data Processing."

Many computer systems, such as logically partitioned networked server computers, are designed and manufactured to operate on a nearly continuous basis. In the event of a system failure, the system is typically required to reboot and resume operation as fast as possible in an effort to minimize the amount of (unproductive) down time. Therefore, such systems are commonly designed on computing platforms (i.e., the underlying hardware and/or software for the systems) with self-diagnosis capabilities, such as capturing error data (e.g., hardware and software states) in the event of a system failure (this process is commonly referred to as a "system dump"). The error data may be used for self-diagnosis, to determine a cause of the failure at the platform level, or may be analyzed at a later time by support staff (e.g., a network engineer), for example, in the event the self-diagnosing system is unable to determine a cause.

Accordingly, it is a general requirement that the error data be preserved at least long enough to be analyzed. Conventionally, error data has been preserved at the platform level through storage to non-volatile memory (i.e., memory maintained in the absence of power), such as a load source disk, so that the error data is maintained even if power is lost. However, some newer computing platforms utilize a simplified "diskless" platform model that owns only processing resources. The diskless platform relies on an operating system for access to non-volatile storage, thus eliminating the need to maintain disk drivers at the platform level.

Because the diskless computing platform does not have direct access to non-volatile storage, the conventional approach for preserving error data at the platform level is unavailable. Accordingly, a new approach for preserving error data is needed for use in a diskless computing platform.

SUMMARY OF THE INVENTION

The present invention generally is directed to a method for preserving error data in a diskless computing platform.

One embodiment provides a method for preserving error data in a computing platform. The method generally includes detecting an error on the platform, collecting error data, storing the error data in volatile storage, and transferring the error data to a target component with access to non-volatile storage.

Another embodiment provides a computer-readable medium containing a program for preserving platform data in a computing platform. When executed by a processor, the program performs operations generally including collecting platform data, storing the platform data in volatile storage, and transferring the platform data to a target component with access to non-volatile storage.

Another embodiment provides a computing platform, generally including at least one system processor, volatile storage, and a service processor. The service processor is generally configured to, in response to detecting the occurrence of one or more platform errors, collect platform error data, store the platform error data to the volatile storage, and transfer the platform error data to a target component with access to non-volatile storage.

Another embodiment provides a logically partitioned computer system generally including one or more logical partitions, each having an associated operating system with access to non-volatile storage, a partition manager configured to create and manage the one or more logical partitions, volatile storage, and a service processor. The service processor is generally configured to, in response to detecting the occurrence of one or more platform errors, collect platform error data, store the platform error data to the temporary storage, and transfer the platform error data to a target component with access to non-volatile storage.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a more detailed flow chart illustrating exemplary operations for preservation of error data in accordance with an embodiment of the present invention.

DETAILED DESCRIPTION OF THE PREFERRED EMBODIMENTS

Figure 1:
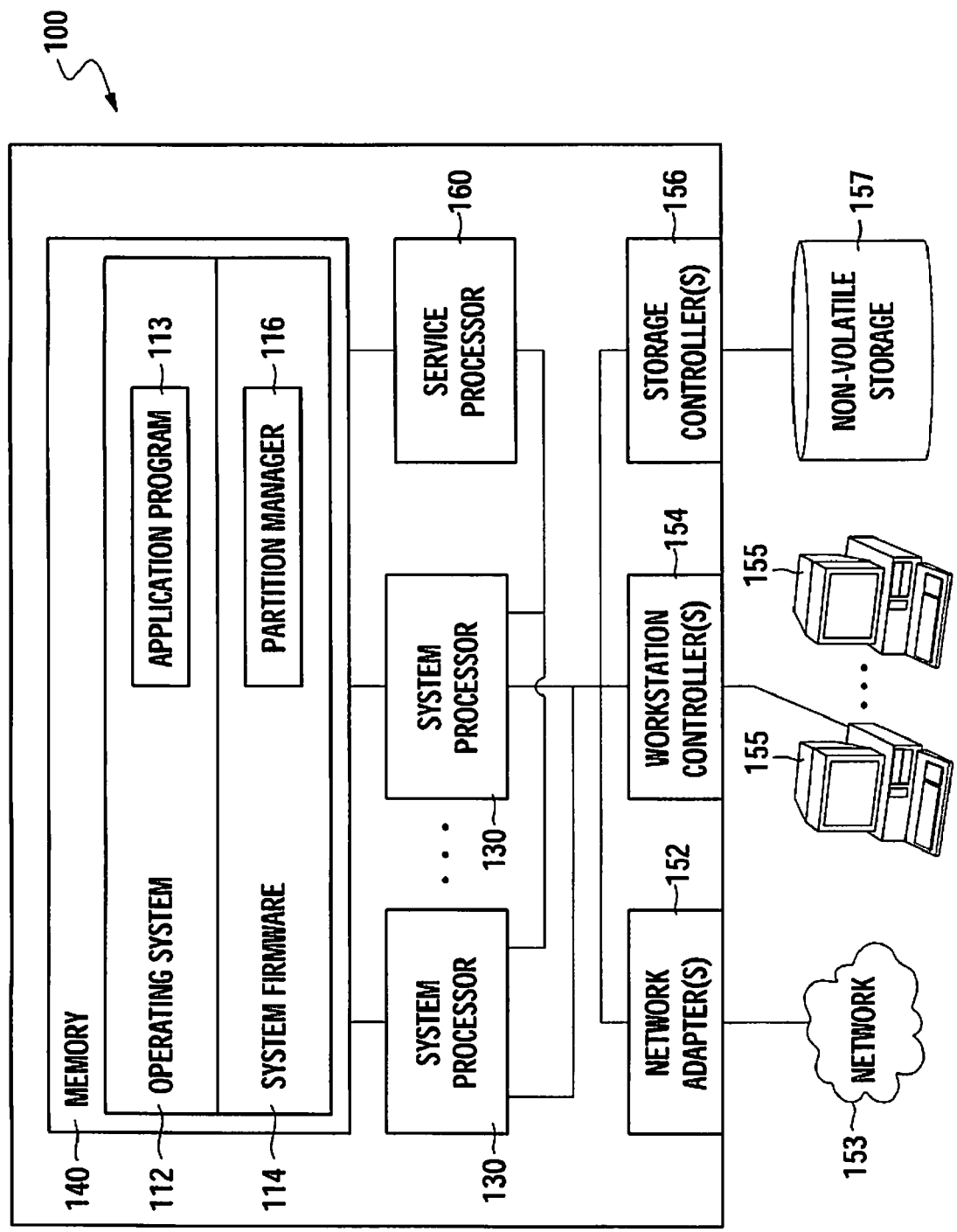
FIG. 1 is a computer system illustratively utilized in accordance with the invention.

The present invention generally is directed to a method, system, and article of manufacture for preserving error data in a diskless platform. In general, upon detecting a platform error, platform error data may be gathered and temporarily stored in volatile storage accessible by the platform. The platform error data may then be transferred to a target system with access to non-volatile storage, for persistent storage therein. Thus, embodiments of the present invention provide the advantages of a diskless platform (e.g., a simplified platform without disk drivers), as well as the advantages of persistent storage of platform error data (e.g., maintaining platform error data for diagnostic purposes even in the event of a power loss).

While embodiments may be described with reference to diskless computing platforms, aspects of the present invention may also be utilized to advantage in computing platforms that have access to non-volatile storage sufficient to hold platform error data, for example, to prevent data stored in such non-volatile storage from being overwritten. Further, aspects of the present invention are not limited to gathering and storing error data in response to detecting platform errors, but may also be used, for example, to occasionally or periodically backup various hardware and/or software state information that may be useful, for example, for system recovery in the event of a power loss.

One embodiment of the invention is implemented as a program product for use with a computer system such as, for example, the computer system 100 shown in FIG. 1 and described below. The program(s) of the program product defines functions of the embodiments (including the methods described herein) and can b e contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet.

In general, the routines executed to implement the embodiments of the invention, may be part of an operating system or a specific application, component, program, module, object, or sequence of instructions, embodied, for example, as system firmware 114, partition manager 116, and firmware of service processor 160. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

An Exemplary Multi-Processor System

The major hardware components of a multiprocessor computer system 100 utilized in accordance with embodiments of the present invention are shown in FIG. 1. While various system components are shown at a high level, it should be understood that a typical computer system contains many other components not shown, which are not essential to an understanding of the present invention. In one embodiment, the system 100 is an eServer iSeries computer system available from International Business Machines (IBM) of Armonk, N.Y., however, embodiments of the present invention may be implemented on other multiprocessor computer systems.

In general, a set of one or more system processors 130 concurrently perform basic machine processing functions on instructions and data from memory 140. For example, the processors 130 may process instructions and data (code) from an operating system 112 (therefore, the processors 130 may be described as being assigned to the operating system 112). The system processors 130 may also process code from system firmware 114, which may include a partition manager 116 used to perform logical partitioning of the system 100 (described in greater detail below). In general, the system firmware 114 represents a layer of firmware that runs on the same system processors 130 as the operating system 112 and is used to provide a low level interface to various hardware components while isolating the operating system 112 from the details of that hardware access.

As illustrated, exemplary hardware components may include one or more network adapters 152, workstation controllers 154, and storage controllers 156. The network adapters 152 represent any suitable type interface to connect the system 100 to a network 153, which may be any combination of a local area network (LAN), wide area network (WAN), and any other type network, including the Internet. The workstation controllers 154 allow the system to connect with one or more workstations 155. Storage controller(s) 156 allow the system 100 to connect with any variety of non-volatile storage devices (collectively represented as non-volatile storage 157), such as direct access storage devices (DASD), tape drives, optical drives, and the like.

The system firmware 114 may also communicate with a service processor 160 of the system 100. The service processor 160 is separate from the system processors 130 used to run the operating system 112 and typically runs specialized firmware code to perform portions of an initial program load (or IPL, also referred to as a boot process), including controlling some component testing. Thus, the service processor 160 typically has controlling access to various hardware components, including the ability to start and stop system processors 130 and read fault isolation registers in various system components.

The service processor 160 may be implemented as a microprocessor, such as a PowerPC processor available from IBM, configured (e.g., programmed via internal or external memory) to perform the operations and functions described herein. The service processor 160 may be configured to help diagnose system problems that occur during run time. For example, the service processor 160 may be configured to detect a hardware error that occurs in one or more system components (e.g., the processors 130 or memory 140), a software error that occurs in one or more software components (e.g., operating system 112, an application program 113 running thereon, or system firmware 114), or a user-suspected system wait or loop condition.

When such an error is detected, a relatively large amount of error data may be collected including, for example, hardware state information (e.g., gathered by the service processor 160 through scan interfaces with various hardware components of the system 100), software state information (e.g., state information of the partition manager 116, and possibly operating system 112, copied from memory 140), as well as a unique identifier (UID), such as a timestamp or generated key, that may be used to relate the error data to the error event, and any other type of data that may be considered useful to diagnose the detected error.

Figure 2:
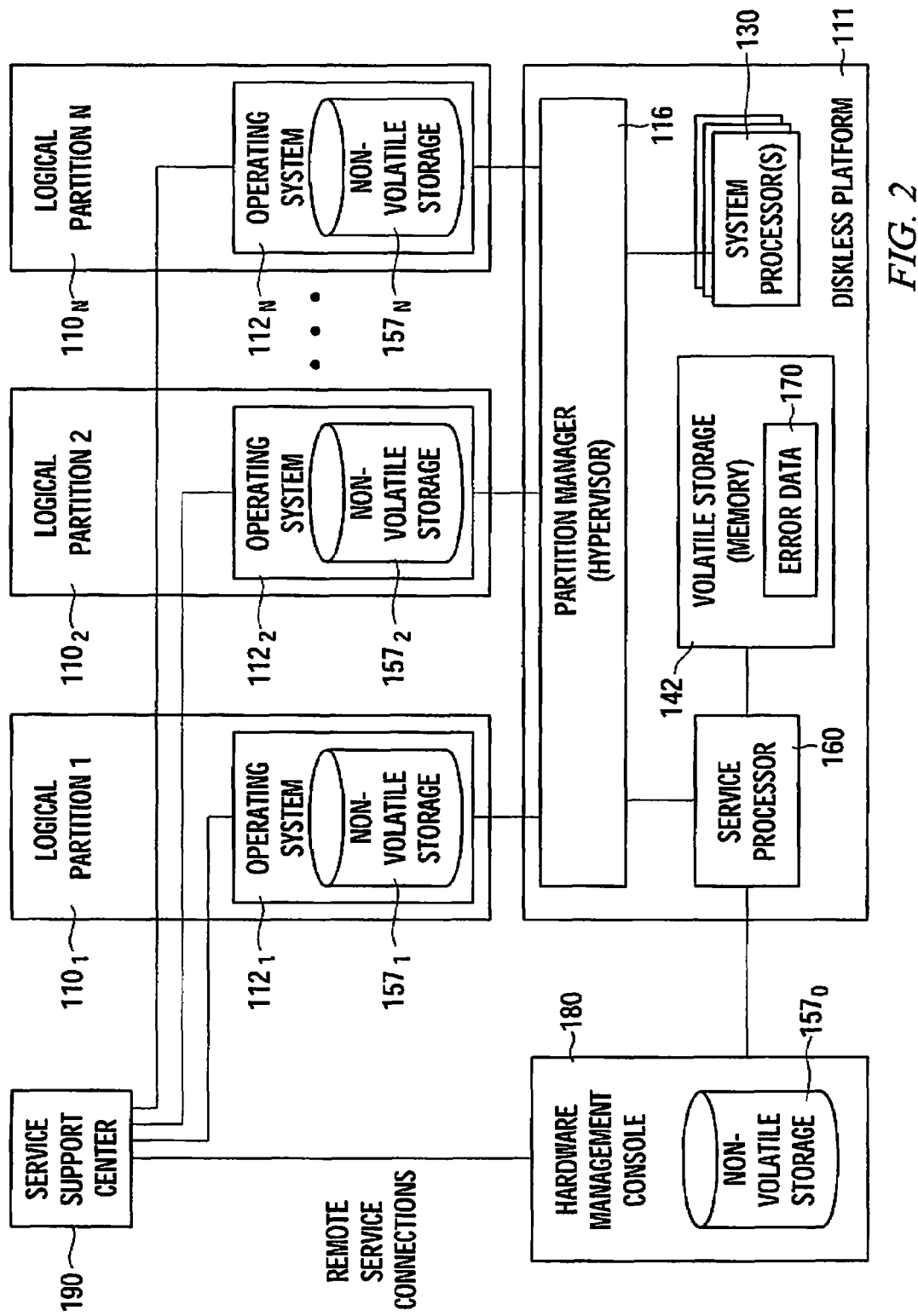
FIG. 2 is a logically partitioned computer system illustratively utilized in accordance with the invention.

As previously described, in conventional computing platforms, once collected, this error data may be stored in non-volatile storage (at the platform level) for later use in diagnosing the cause of the error. However, as illustrated in FIG. 2, the service processor 160, system processors 130, and partition manager 116 may form of a "diskless" platform 111 without direct access to sufficient non-volatile storage to store the error data 170. Therefore, the error data 170, may be temporarily stored in volatile storage 142, prior to transferring the error data 170 to a target system having access to non-volatile storage.

An Exemplary Logically Partitioned System

FIG. 2 illustrates a logically partitioned computer system (built on the diskless platform 111) having one or more logical partitions $110_1$-$110_N$ (collectively partitions 110), each having its own operating system $112_1$-$112_N$, and at least some allocated portion of non-volatile storage $157_1$-$157_N$, respectively. Logical partitioning is indeed logical rather than physical. A general purpose computer suitable for logically partitioning (such as that shown in FIG. 1) typically has physical data connections such as buses running between a resource in one partition and one in a different partition, and from a physical configuration standpoint, there is typically no distinction made with regard to partitions.

Generally, logical partitioning is enforced by the partition manager 116 (referred to in IBM terminology as a "hypervisor"), although there may be a certain amount of hardware support for logical partitioning, such as hardware registers which hold state information. In other words, while there is nothing, from a hardware standpoint, which prevents a task executing in partition $110_1$ from writing to an I/O device in partition $110_N$, the partition manager 116 (and possibly associated hardware) prevents access to the resources in other partitions.

A system administrator (or other similarly authorized user) may configure logical partitioning and perform other low-level system management via an interface, such as a hardware management console (HMC) 180. The service processor 160 may serve as an interface between the partition manager 120 and the HMC 180. The HMC 180 may be implemented as a custom configured personal computer (PC) connected to the computer system 100 (using the service processor 160 as an interface) and used to configure logical partitioning and other low-level system management. As such, the HMC 180 may include non-volatile storage 1570, thus providing another possible target for persistent storage of platform error data 170.

Preservation of Platform Error Data

Figure 3:
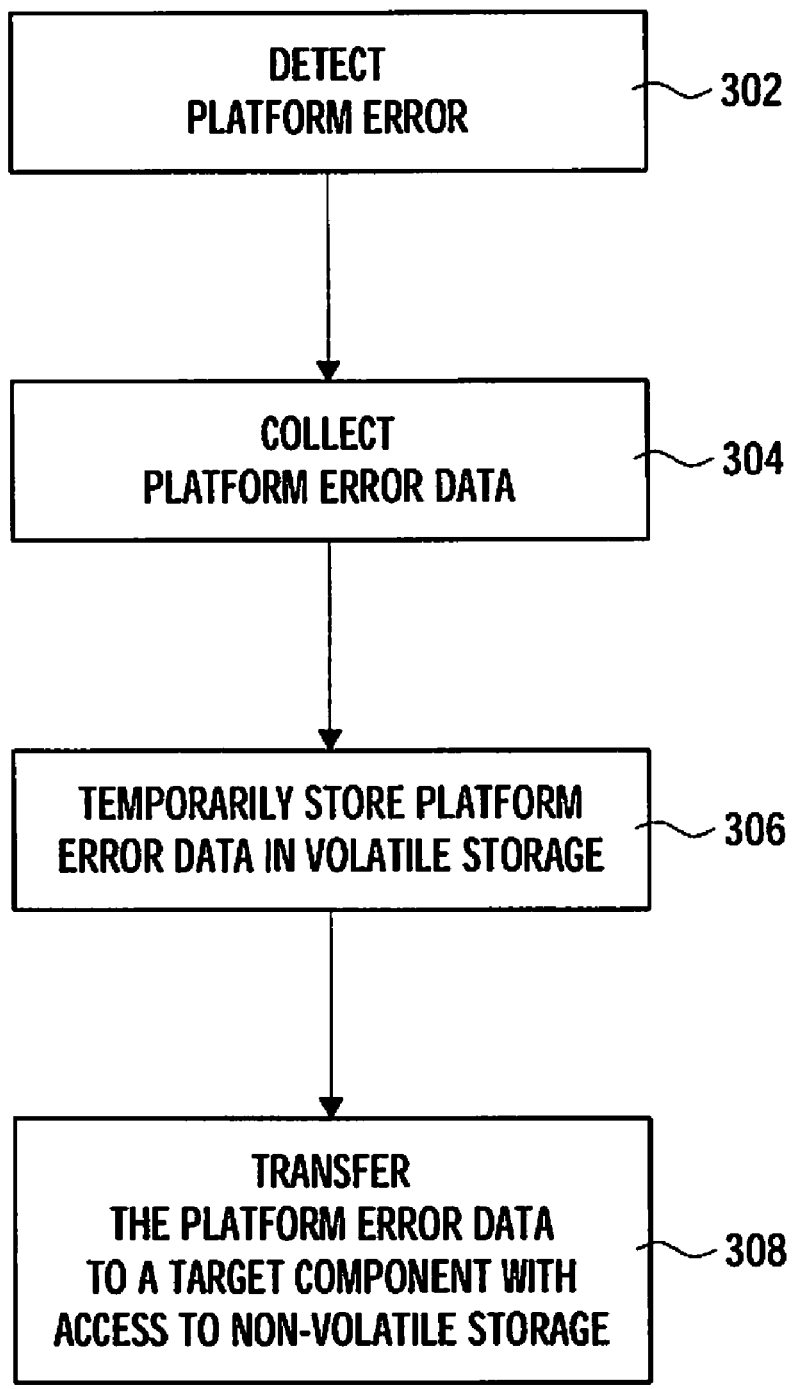
FIG. 3 is a flow chart illustrating exemplary operations for preservation of error data in accordance with an embodiment of the present invention.

FIG. 3 illustrates exemplary operations 300 of a method that may be performed, for example, by the service processor 160, in an effort to collect and preserve error data in the even of a detected failure. The operations 300 may be described with simultaneous reference to FIG. 2. The operations 300 begin at step 302, by detecting a platform error and, at step 304, platform error is collected. As previously described, the platform error may be a hardware error, software error, or a user-detected error, any of which may be directed to the service processor 160, while the platform error data 170 may include any suitable type of hardware and software state information.

At step 306, the platform error data 170 is temporarily stored in volatile storage 142. Depending on the particular implementation, volatile storage 142 may be a portion of system memory 140 allocated to the service processor 160 or may be separate memory dedicated for use by the service processor 160, commonly referred to as control storage memory.

Regardless, at step 308, the platform error data 170 is transferred to a target component with access to non-volatile storage 157. For example, the service processor 160 may transfer the platform error data 170 to one of the logical partitions $110_1$-$110_N$, via the partition manager 116, for storage in non-volatile storage $157_1$-$157_N$. Alternatively, the service processor 160 may transfer the error data 170 to the HMC 180 for storage in non-volatile storage $157_0$. For some embodiments, the service processor 160 may be configured to preferentially transfer the error data 170 to the HMC 180, or similar such direct interface, if present, rather than to an operating system 112, to facilitate the transfer and storage.

For example, the service processor 160 may communicate with the HMC 180 in an "out-band" manner with respect to the partition manager 116. In other words, the service processor 160 may communicate with the HMC 180 even when the partition manager 116 (and/or an operating system 112) is not properly functioning. Transferring the platform error data 170 to the HMC 180 for storage to the (out-band) non-volatile storage $157_0$ may be advantageous because a functioning partition manager 116 and operating system 112 is not required, as with "in-band" non-volatile storage $157_1$-$157_N$. In other words, to transfer the error data 170 to in-band non-volatile storage $157_1$-$157_N$, the service processor 160 would have to ensure the partition manager 116 and at least one operating system 112 is operating properly. If either the partition manager 116 or an operating system 112 are not functioning properly (e.g., one was a source of the detected error), one or both may require an IPL (reboot) to place them in a proper operational state, which may require a prohibitive amount of time, increasing the chance of power loss and loss of the error data 170.

Optimal Target Selection for Storing Platform Error Data

FIG. 4 illustrates exemplary operations 400 that may be performed, for example, by the service processor 160, in an effort to collect and preserve error data in the event of a detected failure, and give preference to an out-band target component, such as the HMC 180. As illustrated, the operations 400 also include operations (422-430) performed by the target component. The operations 400 begin at step 402, by detecting a platform error and, at step 404, platform error data 170 is collected (just as in steps 302 and 304 of FIG. 3).

However, at step 406, a determination is made as to whether out-band non-volatile storage (e.g., non-volatile storage accessible by an out-band target component, such as the HMC 180) is available. If so, the out-band component is selected as a target to store the platform error data 170, at step 408. For some embodiments, the determination may simply involve detecting the presence of the HMC 180. If there is no out-band non-volatile storage available, the platform 110 may have to rely on an operating system 112 of a logical partition 110 for access to non-volatile storage 157. However, to operate a logical partition 110, typically the partition manager 116 must be operating normally.

Therefore, at step 410, a determination is made as to whether the partition manager (hypervisor) 116 is operating normally. If so, a determination is made as to whether the logical partitions 110 are operating properly and, if so, a logical partition 110 is selected as a target to store the platform error data 170, at step 418. If the logical partitions 110 are not operating properly, the logical partitions 110 are rebooted, at step 416. If the partition manager 116 is not operating properly, the partition manager 116 is rebooted, as step 412. For some embodiments, if more than one logical partition is rebooted, the service processor 160 may be configured to transfer the platform error data 170 to the first logical partition to become available.

Regardless of which type of target component is selected (e.g., the HMC 180, other type out-band target component, or a logical partition 110), the platform signals the target component, to indicate new platform error data 170 is available, at step 420. For example, the service processor 160 may signal the HMC 180 through direct communication, or may signal a logical partition 110 via the partition manager 116. The signal may take the form of a message that includes a key to the platform error data 170, as well as various other information, such as the size (amount) of the platform error data 170, so the targeted component can determine how much non-volatile storage 157 is required.

At step 424, the target fetches the platform error data 170 (e.g., from volatile storage 142 of the platform 110) and, at step 426, the target stores the platform error data 170 in non-volatile storage 157. Due to the potentially large size of the platform error data 170, the target component may fetch only a portion at a time. Therefore, at step 426, a determination is made as to whether there is additional platform error data 170 and, if so, the operations 422-424 are repeated.

Of course, until the platform error data 170 is stored, no components should be able to overwrite the platform error data 170 in the volatile storage 142. Therefore, the service processor 160 may be configured to prevent access (by the logical partitions 110) to the volatile storage 142 used to hold the platform error data 170. Once all the platform error data 170 has been stored, however, the target component may signal the platform, at step 428. Upon receiving this signal from the target component, at step 432, the platform may free-up the volatile storage 142 used to hold the platform error data 170, thus minimizing the amount of time the volatile storage 142 is unavailable for other uses.

At step 430, the platform error data 170 is sent to a service support center 190, shown in FIG. 2 as operatively connected to the logical partitions 110 and the HMC 180 (e.g., via network connections), for analysis. For example, the service support center 190 may be staffed with personnel (e.g., network engineers) trained to analyze the platform error data 170 in detail, in an effort to determine a cause of the failure that resulted in the detected platform error.

Conclusion

By transferring collected platform error data to a target component with access to non-volatile storage, a "diskless" computing platform may successfully perform a "system dump" of error data through the temporary storage of the error data in local, volatile storage. Thus, embodiments of the present invention provide the benefits of a diskless platform (less complexity without the required support of disk drivers) while maintaining the advantages of preserving platform error data for diagnostic purposes.

While the foregoing is directed to embodiments of the present invention, other and further embodiments of the invention may be devised without departing from the basic scope thereof, and the scope thereof is determined by the claims that follow.

What is claimed is:

1. A method for preserving error data in a computing platform, the method comprising:
   detecting an error on the computing platform, wherein the platform does not contain non-volatile storage;
   collecting computing platform error data related to the detected error, wherein the error data comprises hardware state information and software state information;
   storing the computing platform error data in volatile storage; and
   transferring the error data from the volatile storage to a target component with access to non-volatile storage, wherein transferring the error data comprises transferring the error data to a logical partition; and
   rebooting the logical partition, in response to determining the logical partition is not operating properly.

2. The method of claim 1, further comprising rebooting a system firmware component that manages the logical partition, in response to determining the system firmware component is not operating properly.

3. The method of claim 1, further comprising selecting the target component.

* * * * *